May 12, 1942.   R. G. HUMPHREY   2,283,158
SOLDER CONNECTING APPARATUS
Filed Dec. 31, 1940   7 Sheets-Sheet 1

INVENTOR
R. G. HUMPHREY
BY
J. MacDonald
ATTORNEY

May 12, 1942. R. G. HUMPHREY 2,283,158
SOLDER CONNECTING APPARATUS
Filed Dec. 31, 1940 7 Sheets-Sheet 2

INVENTOR
R. G. HUMPHREY
BY J. MacDonald
ATTORNEY

May 12, 1942.    R. G. HUMPHREY    2,283,158
SOLDER CONNECTING APPARATUS
Filed Dec. 31, 1940    7 Sheets-Sheet 3

INVENTOR
R. G. HUMPHREY
BY J. MacDonald
ATTORNEY

May 12, 1942.  R. G. HUMPHREY  2,283,158
SOLDER CONNECTING APPARATUS
Filed Dec. 31, 1940  7 Sheets-Sheet 4

INVENTOR
R. G. HUMPHREY
BY J. MacDonald
ATTORNEY

May 12, 1942.  R. G. HUMPHREY  2,283,158
SOLDER CONNECTING APPARATUS
Filed Dec. 31, 1940  7 Sheets-Sheet 5

INVENTOR
R. G. HUMPHREY
BY J. MacDonald
ATTORNEY

Patented May 12, 1942

2,283,158

UNITED STATES PATENT OFFICE 2,283,158

SOLDER CONNECTING APPARATUS

Robert G. Humphrey, Pelham, N. Y., assignor to Bell Telephone Laboratories, Incorporated, New York, N. Y., a corporation of New York Application December 31, 1940, Serial No. 372,528

2 Claims. (Cl. 219—12)

This invention relates to electrowelding apparatus for and a method of securing a wire of relatively fine gauge to a metal surface.

The invention is applicable to the securing of wires of relatively fine gauge to metal surfaces formed on piezoelectric crystals.

In accordance with this invention a pellet of solder of predetermined size and form is cast on an end of the wire, the pellet is then placed in contact with a suitably prepared metal surface on a crystal element, and a solder connection is then made to electrically connect the wire to the metal surface.

When the invention is used in connecting wires to crystal elements the solder connections made are of such form and character that the wires may be used not only as lead-in wires for the crystal elements but also as supporting means for the crystals.

The invention provides a method of and apparatus for accurately and rapidly making entirely satisfactory solder connections between wires of very fine gauge and the electrode surfaces of piezoelectric quartz crystals.

The solder pellet caster device is covered in a divisional application of this case, Serial No. 434,573, filed March 13, 1942, and the hot plate device is covered in a divisional application of this case, Serial No. 434,574, filed March 13, 1942.

Figure 1:
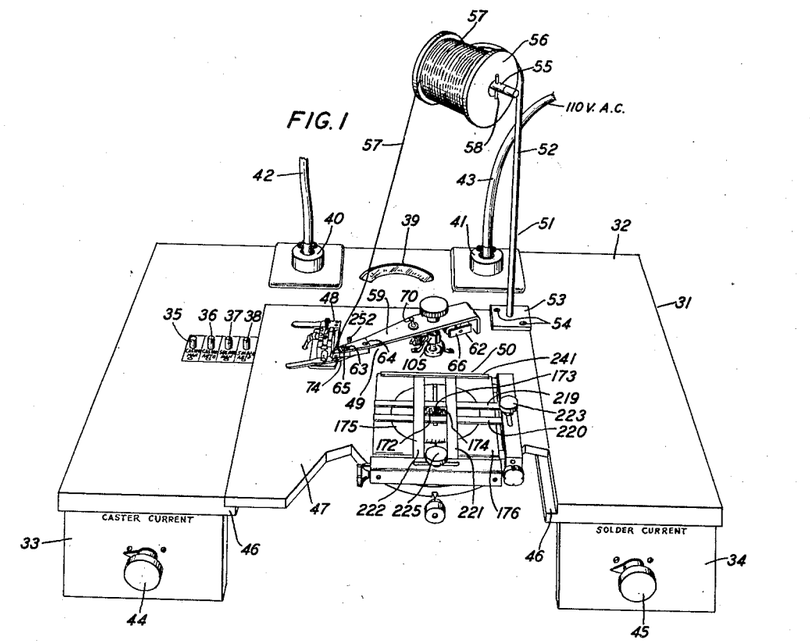
Fig. 1 is a top and front view in perspective of a support with the apparatus mounted in required positions.

Referring to Fig. 1 the support 31 comprises a U shaped top 32 with downwardly extending walls 33 and 34. On the top 32 are mounted manually operated switches 35, 36, 37 and 38, an ammeter 39 and plug receptacles 40 and 41 to receive electrical supply lines 42 and 43. Manually operated control knobs 44 and 45 are mounted on shafts not shown but which extend through the respective wall members 33 and 34. Set within the space defined by the inner portion of the top 32 and resting on ledges 46 formed thereon is a slab 47 of suitable insulating material on which are mounted the caster device 48, the chuck 49, the hot plate device 50 and a reel support 51. The various devices by means of which the wire connections are made are so arranged and mounted on the support 31 and the slab 47 that the wire connections can be made in a rapid and accurate manner. The reel support 51 comprises a post 52 secured at its lower end in a flange 53 suitably mounted on the slab 47 by means of screws 54. The upper portion of the post 52 is bent to provide an axle 55 on which is rotatably supported the reel 56 containing a supply of wire 57, the reel 56 being retained against accidental dislodgement from the axle 55 by means of a crosspin 58. The wire 57 is led downward from the reel 56 to the chuck 49.

To enable a complete understanding of the invention a detail description of the devices employed in making the wire connections is given under separate headings.

Chuck

The chuck 49 is designed to receive and hold in a required position an end portion of the wire 57 preparatory to and while the end of the wire is being connected to the electrode surface on a crystal element. The chuck 49 as shown in Figs. 1 to 10 comprises an arm 59 supported on the under-side of which are jaws 60—61 and an electromagnet 62. The jaw 61 is maintained in a fixed position by means of the headed pin 63 and the screw 64, which extends through apertures in the arm 59. The jaw 60 is pivotally supported by means of the headed pin 65 which extends through an aperture in the arm 59 and into the jaw 60 near the gripping end of the jaw. The other end of the jaw 60 is extended to the portion of the electromagnet 62 and is connected to the armature 66 thereof by means of a rod 67. A retracting spring 68 is provided to normally maintain the jaws 60 and 61 in an open condition, the spring 68 being secured at one end to the jaw 60 and having its other end held by an apertured plate 69. When an end of the wire 57 is inserted between the gripping ends of the jaws 60 and 61 and the electromagnet 62 is energized to attract its armature 66 the jaw 60 is operated to move its gripping end toward the corresponding end of jaw 61 to clamp the wire between the jaws and thus hold the wire in a required position. When the electromagnet 62 is deenergized the spring 68 moves the jaw 60 back to normal position to release the wire 57. A switch 70 is insulatingly mounted on the arm 59 to control the operation of the electromagnet 62, which is supplied with operating current from a source 71 over an obvious circuit shown in Fig. 2 including the conductors 72 and 73. The arm 59 is made of conducting material and carries a contact finger 74 which is insulatingly supported on the arm and extends below the gripping ends of the jaws and is secured at one end in a pile-up 75 mounted on the under-side of the arm by means of the screws 76. The pile-up 75 contains the plate 69 which may be made of insulating material or be suitably insulated from the finger 74 and the arm 59. The arm 59 is electrically connected to one side of the source of current supply 71 by the conductors 73 and 77. The function of the contact finger 74 will be subsequently explained.

The arm 59 is apertured to receive an upper end portion of an upright rotatable shaft 78 and rests on a flanged collar 79 which is secured to the upper portion of the shaft 78 by means of the screws 80. The shaft 78 is journaled in a bearing 81 supported in an aperture in the slab 47, the bearing 81 being equipped with an upper flange and having a male threaded lower end to receive a nut and washer 82 so that the bearing is clamped in position in the slab 47. The shaft 78 is also journaled in a lower bearing 83 supported in an apertured plate 84 located below the slab 47, the plate 84 being supported by means of screws 85 on the lower ends of pillars 86 which extend downwardly from the slab 47, the upper ends of the pillars being held by screws 87 extending through the slab 47. The upper end of the shaft 78 is equipped with a manually operated knob 88 by means of which the arm 59 may be rotated and also lifted relative to the slab 47, the shaft 78 being rotatable and also longitudinally slidable within the bearings 81 and 83. A counter-weight device 89 is provided to lend a partial lifting effect to the shaft 78 and the arm 59 so that the weight of these parts and the apparatus supported on the arm 59 will not be such as to create too great a pressure on a wire held in the jaws and the parts or elements upon which the end of the wire is rested. The counter-weight device 89 comprises a lever 90 fulcrumed in a bracket 91 supported on and extending below the plate 84. A weight 92 is adjustably supported on one end of the lever 90 and the unweighted end of the lever 90 bears upwardly against the lowermost end of the shaft 78. The weight 92 is adjusted so that its effect will not be quite sufficient to raise the shaft 78 and the arm 59 from the position shown in Fig. 4. Supported on the upper surface of the plate 84 are two positioning pins 93 and 94 and a U-shaped bracket 95, the bracket 95 serving as a support for a wheel 96. The pins 93, 94 and the wheel 96 serve in cooperation with a flat bar 97 to hold the shaft 78 and the arm 59 in two definite positions of rotation. The bar 97 is apertured near one end to receive the shaft 78 and is provided with a collar 98 which is secured to the shaft 78 by means of set screws 99. Notches 100 and 101 are provided in the bar 97 to receive the wheel 96 and an aperture 102 is provided in the bar 97 to receive the pin 93 when the bar is in one position and the pin 94 when the bar is rotated to another position. To prevent undue rotational movement of the arm 59 two spring fingers 103 and 104 are mounted on the slab 47 to frictionally engage the sides of a longitudinally split cylinder 105 which is clamped in place about the shaft 78 by means of the set screws 106.

A tapered shell 107 is mounted on the free end of the jaw 61 by means of pins 108 and a screw 109, the shell 107 being apertured to receive the pins 108 and the screw 109. It will be seen in Fig. 10 that the shell 107 extends down one side of the jaw 61 and across the upper and lower portions of the jaws 60 and 61 and that a large aperture 110 is provided in the upper portion of the shell to permit extending of the wire 57 to the jaws 60 and 61 and that a cone-shaped aperture 111 is provided in the lower portion of the shell 107. A button 112 made of material to which solder will not adhere is supported within the aperture 111. The button 112 is shaped on its upper portion to fit the aperture 111 and has a lower reduced end portion 113 extending below the shell 107. The button 112 may be made of aluminum oxide or of some other material found suitable for the purpose and is longitudinally bored to slidably receive the wire 57. The function of the button 112 is important as will be subsequently pointed out.

Caster device

Figure 11:
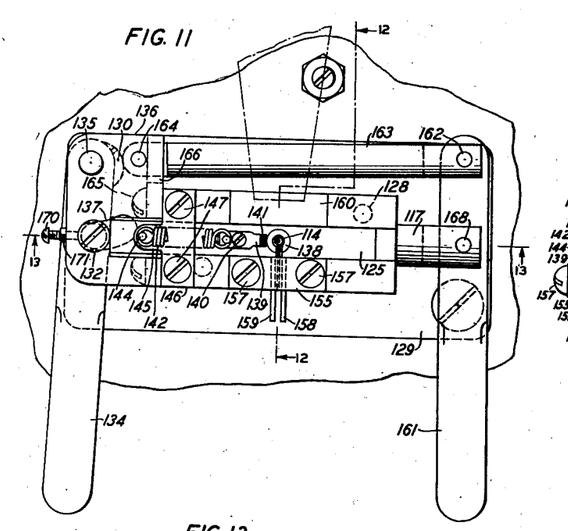
Fig. 11 is a top view of the solder pellet caster device enlarged relative to Fig. 1.
Figure 12:
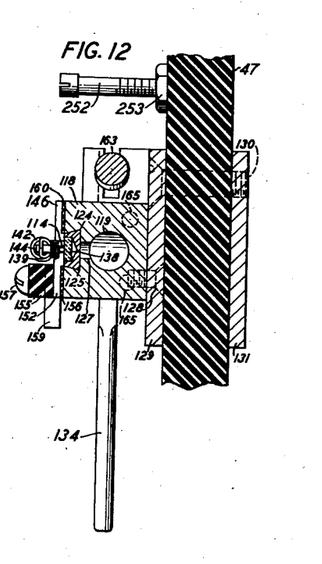
Fig. 12 is a view in section of parts shown in Fig. 11 and taken on the line 12—12.

The caster device 48 is used to cast a pellet of solder on the end of the wire 57 and as shown in Figs. 11 through 18 comprises a crucible 114, a reservoir 115 for holding a supply of solder paste 116 and a plunger 117 for forcing the solder paste 116 into the crucible 114. The reservoir 115 comprises a block 118 of metal or other suitable material, longitudinally bored at 119 to receive the plunger 117 which projects into one end of the bore 119. The other end of the bore 119 is closed by means of a relatively long plug 120 which is held in place by means of a screw 121 extending through an apertured end plate 122. The inner end of the plug 120 is shaped at 123 to provide a dished inclined surface. The top of the block 118 is longitudinally slotted and milled out to provide a dovetail track 124 as shown in Fig. 12 to slidably receive a slide bar 125 having a conical aperture 126 formed therein which may be brought into register with an aperture 127 in the base of the dovetail track 124, the aperture 127 having communication with the reservoir 115. The block 118 is mounted by means of screws 128 on an apertured base plate 129 resting on the slab 47 and secured thereto by means of the screws 130 and a screw holding plate 131.

The slide bar 125 is frictionally engaged at one end by the enlarged head portion 132 of a stud 133, the male-threaded lower end of which is mounted on a manually operated lever 134. The lever 134 is pivotally supported at one end by means of a screw 135 which extends upwardly into an overhanging flange 136 integral with the end plate 122. The flange 136 is provided with an elongated curved aperture 137 designed to accommodate movement of the head portion 132 of the stud 133. The slide bar 125 may be longitudinally moved by operation of the lever 134 and relative to the crucible 114 which is supported in a fixed position as will be subsequently explained. A disc 138 of quartz or other suitable material is mounted in the upper surface of the slide bar 125, the slide bar being suitably recessed to receive the disc and the upper surface of the disc being flush with the upper surface of the slide bar. The disc 138 is of larger diameter than the crucible 114 and serves as a removable closure for the bottom of the crucible 114. A small block 139 is mounted by means of a screw 140 on the upper surface of the slide bar 125 and is undercut to provide an overhanging portion 141 which serves as a removable top closure for the top of the crucible 114. A helical spring 142 is provided to bring the slide bar 125 back to normal position, the spring 142 being attached at one end to a pin 143 supported on the slide bar 125 and being secured at the other end to a pin 144 mounted on a tab portion 145 of a bridge plate 146, the bridge plate 146 being disposed across the slide bar 125 and secured by means of screws 147 to the top of the block 118.

Figure 17:
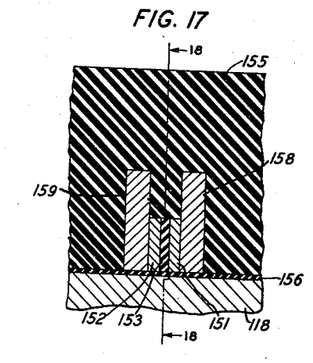
Fig. 17 is a front view, in section, of Fig. 16 and taken on the line 17—17.
Figure 18:
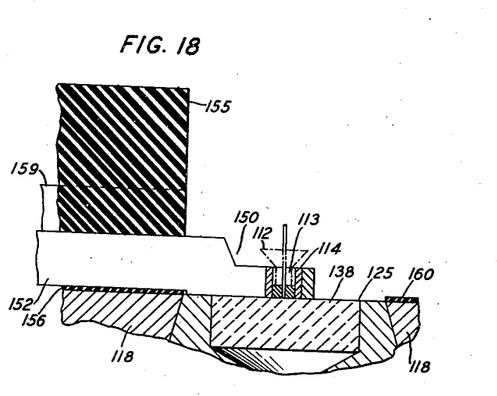
Fig. 18 is a side view, partly in section, of parts shown in Fig. 17, taken on the line 18—18 and showing also a wire and a solder pellet cast in the crucible and a pressure button inserted in the crucible.

The crucible 114 is electrically heated and comprises a ring 148 made of material suitable for transmitting heat to the solder paste in the crucible and for holding the solder when the solder is in a molten condition. I have found that stainless steel may well be used as the material for the ring 148. The ring 148 has an internal diameter about equal to the diameter of the solder pellet it is desired to cast and is frictionally held in the closed end portion 149 of a U-shaped bar 150 of electrical resistance material. A suitable material for the bar 150 is a nickel-chromium composition known to the trade as Nichrome. The two leg portions 151—152 of the bar 150 are connected to a suitable source of current supply to heat the bar 150 to a sufficient temperature to melt solder paste in the crucible 114, the heat being transmitted through the ring 148 to the solder paste. The ring 148 may be made of electrical insulating material to prevent the electrical current from passing through the ring to the solder paste held therein. It may be made, however, as above mentioned of stainless steel since the outside of the ring when made of this material soon becomes sufficiently oxidized to prevent the electrical current from passing through the ring. A strip 153 of insulating material is interposed between the leg portions 151 and 152 of the bar 150 to prevent short-circuiting of the leg portions, the strip 153 being held in place by means of suitably insulated screws or bolts, not shown, but which extend through aligned apertures 154 provided in the leg portions 151, 152 and the strip 153. The bar 150 as shown in Figs. 17, 18 and 12 is supported in an insulating block 155 and rests on an insulating strip 156, the block 155 and the strip 156 being mounted on the upper surface of the block 118 by means of screws 157. Spaced electrodes 158 and 159 are supported in the insulating block 155 and in electrical contact with the leg portions 151 and 152 respectively of the bar 150 to carry current to the bar 150, the electrodes 158 and 159 extending outwardly of the block 155 a sufficient distance to permit connection to a suitable source of current supply. An insulating strip 160 is mounted on the block 118 across from the insulating strip 156. The strip 160 may be cemented or otherwise secured to the block 118 and serves as an insulating rest for the contact finger 74 on the chuck 49 when the chuck is being used over the caster device 48.

The plunger 117 is equipped with a manually operated lever 161 which is pivotally supported at one end on a pin 162 which extends through the lever 161 and through one end of a link 163, the other end of the link 163 being pivotally supported on a pin 164 mounted on the under surface of the overhanging flange 136 of the end plate 122, the end plate 122 being secured to the block 118 by means of screws 165 and being apertured at 166 to accommodate an end portion of the link 163. The lever 161 extends through a recess 167 in the outer end of the plunger 117 and is pivotally supported therein by means of a rivet 168.

Figure 19:
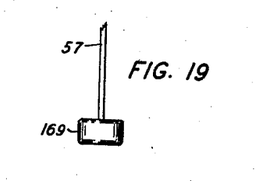
Fig. 19 is an enlarged view of a portion of the wire and the solder pellet cast on the wire.

The caster device 48 in cooperation with the chuck 49 is used in casting a pellet of solder of predetermined size and form on the end of the wire 57. Fig. 19 shows the pellet 169 cast on the end of the wire 57. The size and form of the pellet 169 are controlled by the internal dimensions of the crucible 114, the amount of solder paste projected therein and the extent to which the reduced end portion 113 of the button 112 is inserted in the crucible 114.

Figure 13:
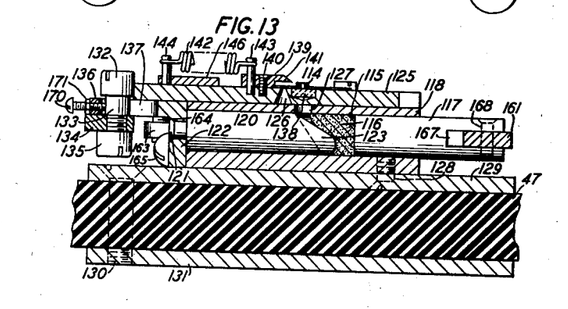
Fig. 13 is a front view, in section, of Fig. 11 and taken on the line 13—13.
Figure 14:
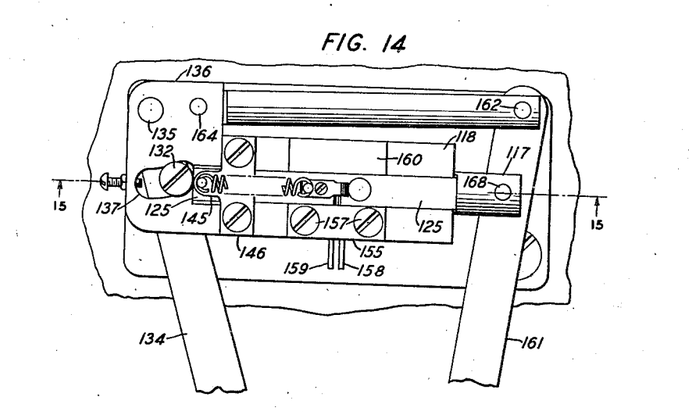
Fig. 14 is a view corresponding in general to Fig. 11 but with certain of the parts operated to different positions.
Figure 15:
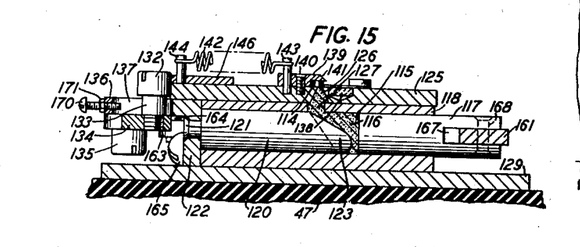
Fig. 15 is a front view, in section of Fig. 14 and taken on the line 15—15.
Figure 16:
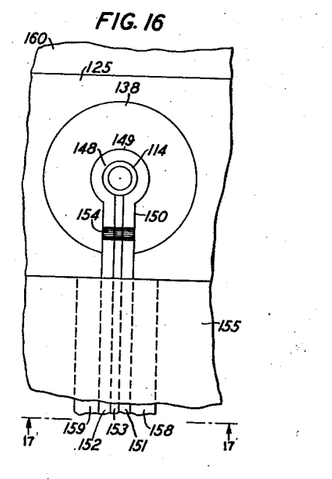
Fig. 16 is a greatly enlarged view of a portion of Fig. 11 and shows a crucible employed in the device shown in that figure.

In order to fill the crucible 114 with the solder paste 116 the slide bar 125 is moved by means of lever 134 from the position shown in Figs. 11 and 13 to the position shown in Fig. 15, the head portion 132 of the stud 133 serving to transmit movement of the lever 134 to the slide bar 125. In this operation the spring 142 is elongated to provide sufficient spring tension to restore the slide bar 125 to its former position when the lever 134 is released. In the position shown in Fig. 15 the disc 138 has been removed from the bottom of the crucible 114 and the conical aperture 126 in the slide bar 125 is in register with the aperture 127 in the block 118 and is in register with the crucible 114. The overhanging portion 141 of the block 139 is over the crucible 114 to close the top of the crucible. While the slide bar 125 is in this position the lever 161 is operated to move the plunger 117 from the position shown in Fig. 13 to the position shown in Fig. 15. In this movement solder paste 116 is forced from the reservoir 115 upwardly through the aperture 127 and the conical aperture 126 and into the crucible 114, emergence of the solder paste from the top of the crucible 114 being prevented by the overhanging portion 141 of the block 139. The levers 134 and 161 are then in the positions shown in Fig. 14. Since the stud 133 has reached one end of the slot 137 further movement of the lever 134 in this direction is prevented.

When the lever 134 is manually released the spring 142 returns the slide bar 125 and the lever 134 back to the normal position shown in Figs. 11 and 13. In this position the block 139 is away from the crucible 114 so that the overhanging portion 141 is no longer over the top of the crucible. The disc 138 is directly under the crucible 114 and serves as a bottom for the crucible which is filled with the required amount of solder paste 116 for making the pellet 169. A screw 170 equipped with a lock nut 171 is adjustably supported in the outer end of the overhanging portion 136 of the end plate 122 and may be turned to project into one end of the slot 137 to limit the return movement of the lever 134 and the slide bar 125 and so that the disc 138 will be directly under the crucible 114.

Hot plate device

The hot plate device 50 is used to heat a crystal element to a required temperature and to hold the crystal in a required position while a wire is being solder-connected to a metallized surface on the crystal element, the crystal being heated to a temperature slightly below the melting point of the solder to reduce reaction of the crystal when a melting temperature is applied to the point at which the solder connection is being made.

As shown in Fig. 1 the hot plate device 50 is mounted on the slab 47 in such position that the chuck 59 may be rotated thereover. In this figure a crystal element 172 is supported on the hot plate device 50 in a position to have an end of the wire 57 solder-connected to a stripe 173 of solder on the crystal element. The crystal element 172 may be of any desired size and form and may be made of any required material. It will be assumed, however, merely for the purpose of explaining the invention that the crystal comprises a rectangular slab of quartz coated on its upper and lower major plane surfaces with metal as shown at 174. The metal coatings 174 serve as electrodes for the quartz crystal and may be for instance coatings of silver or other suitable material applied to the crystal, for example, by sputtering or by an evaporation process. The stripe 173 is shown as being located at a nodal point of the crystal but may be located at any other desired point, the point of location being determined by the particular character and form of the crystal and the use required. In piezoelectric crystals of the form shown, however, it is advantageous to have the wire connected at the nodal point since the mechanical load of the wire and the metal stripe on the crystal would then be at the lowest point of oscillation. For the purpose of illustration and not in the sense of limiting the invention it will be assumed that the stripe 173 is a stripe of silver solder applied by any suitable means and manner across the flat plane surface of the crystal at the nodal point of the crystal.

Figure 24:
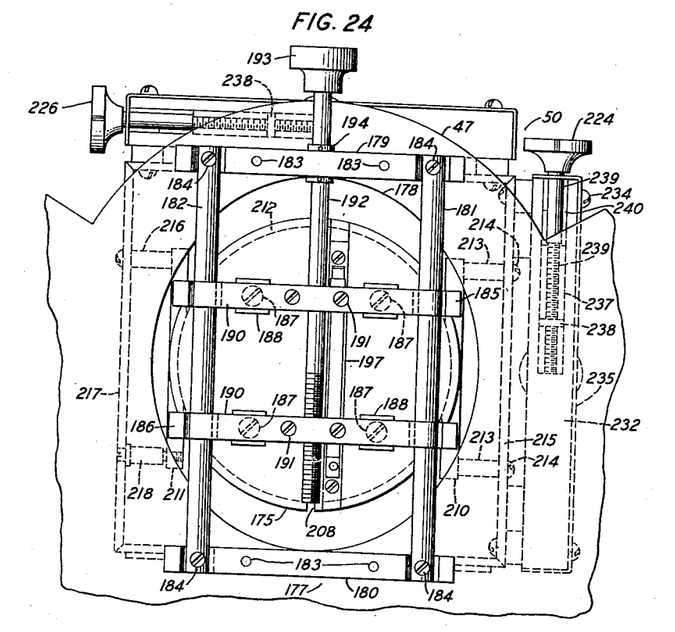
Fig. 24 is a view, partly in section, of the hot plate and a portion of the support and taken from beneath the support.

The hot plate device 50 comprises a round table 175 and a rectangular frame plate 176 which is apertured to accommodate the table 175, the table 175 and the frame plate 176 being supported so that their upper surfaces are elevated relative to the slab 47. The table 175 and the frame plate 176 are adjustably mounted on a frame structure 177 supported on the under surface of the slab 47 and so that the table and frame may be moved as a whole backward and forward across a portion of the slab 47. As shown in Fig. 24 the slab 47 is provided with a relatively large oval aperture 178 to accommodate the table 175 which is relatively thick. The table 175 is made of suitable heat transmitting material, such, for instance, as aluminum or an aluminum composition and extends downwardly within the aperture 178. The frame structure 177 comprises the bars 179, 180 and the track rods 181 and 182, the bars 179 and 180 being secured to the under surface of the slab 47 by means of the screws 183 and the track rods 181 and 182 being secured at their ends to end portions of the bars 179, 180 by means of the screws 184. Cross-bars 185, 186 are mounted on the under surface of the table 175 by means of the screws 187 extending through spacers 188 and rest on the track rods 181, 182, and cross-bars 185—186 being grooved at 189 to receive the track rods. Leaf springs 190 mounted on the under surfaces of the cross-bars 185, 186 by means of the screws 191 extend into frictional engagement with the under portions of the track rods 181, 182 to hold the table 175 against undue lifting movements relative to the track rods. A rotatable shaft 192 equipped with a manually operable knob 193 is provided to move the table and the frame plate as a whole relative to the slab 47, the shaft 192 being journaled in a bearing 194 in the bar 179 and being journaled in the cross-bar 185 and having screw-threaded engagement with a female threaded aperture in the cross-bar 186. The round table 175 is equipped with cartridge type electrical heating elements 195 which are located in apertures 196 provided in the round table. A thermostat 197 is mounted in a slot 198 provided in the under surface of the table 175 to automatically control the operation of the heating elements 195. The thermostat 197 comprises a movable bimetallic contact finger 199 and a fixed contact strip 200 mounted at one end in a pile-up 201, which is mounted on a rectangular mounting strip 202 supported by means of screw 203 in the slot 198. An insulating strip 204 is interposed between the fixed contact strip 200 and the mounting strip 202. The bimetallic contact finger 199 normally rests against an adjustable back stop 205 supported at one end in the pile-up 201 and having its other end supported in a nut 206 mounted on a screw 207 supported in the table 175. Turning of the screw 207 will cause adjustment of the bimetallic contact finger 199 relative to the fixed contact strip 200. An elongated aperture 208 is provided in the table 175 to accommodate wires after they have been attached to the crystal element and while other wires are being attached to the opposite face of the crystal element the aperture 208 extending from an outer edge of the table 175 and more than half the distance across the table 175 and the width of the aperture 208 being much greater than the diameter of the wires.

The frame plate 176 is in the form of an inverted rectangular tray and rests on an annular shoulder 209 formed on the upper edge of the table 175. The frame plate 176 may be turned relative to the table 175 and is held against lifting movement relative to the table 175 by means of holding bars 210, 211 extending into an annular groove 212 provided in the outer edge of the table 175. The holding bar 210 is supported on posts 213 secured by means of screws 214 to a side wall 215 of the frame plate 176. The holding bar 211 is supported at one end on a post 216 extending inwardly from the opposite side wall 217 of the frame plate 176 and on its other end has screw threaded engagement with a shouldered head adjusting screw 218, the shouldered head portion of which bears against the wall 217 and having the reduced end portion of the head journaled in an aperture in the wall 217. The holding bars 210 and 211 are machined out to fit the curvature of the groove 212 in the outer portion of the table 175. When the screw 218 is tightened the frame plate 176 will be held in a required rotated position relative to the table 175 since the bar 211 will be pressed against the base of the groove 212.

Figure 20:
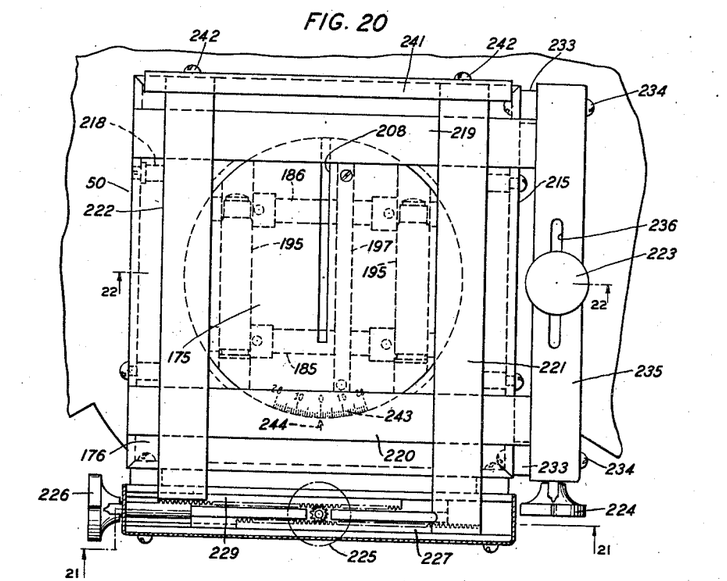
Fig. 20 is a top plan view, partly in section, of a hot plate equipped with means for adjusting and holding the crystal in required position.
Figure 21:
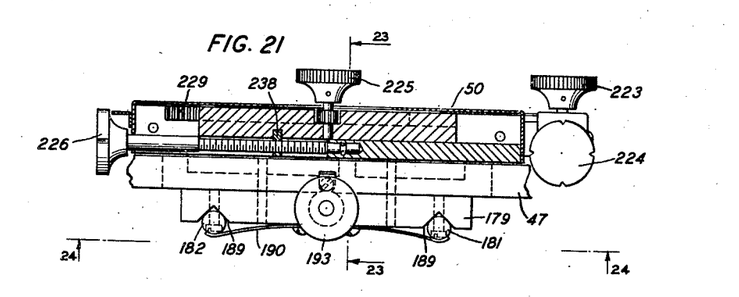
Fig. 21 is a front view, partly in section, of Fig. 20 taken on the line 21—21.
Figure 22:
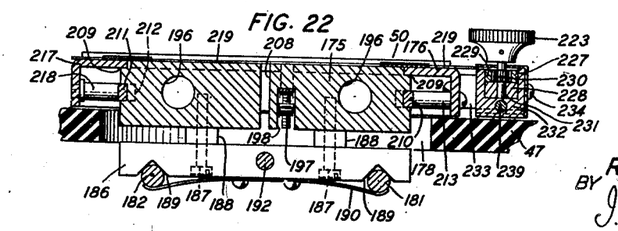
Fig. 22 is a view, in section, taken on the line 22—22 in Fig. 20.
Figure 23:
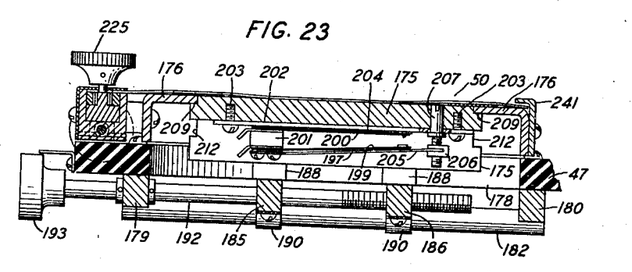
Fig. 23 is a side view, in section, of Fig. 21 taken on the line 23—23.

Two sets of positioning bands are provided to cooperatively form an adjustable frame for holding a crystal element in required position on the table 175. One set of bands comprises the bands 219—220 and the other set the bands 221—222. The bands 219—220 extend across the upper surfaces of the frame plate 176 and the table 175 from right to left and are adjustably held in required parallel spaced relation. The bands 221 and 222 extend across the upper surfaces of the frame plate 176 and the table 175 from front to back and lie over the respective bands 219 and 220. Means are provided for separately adjusting each set of bands, the bands 219 and 220 being adjustable by means of the manually operated knobs 223, 224 and the bands 221 and 222 being adjustable by means of knobs 225 and 226. Since the bands and the means for adjusting them are identical in structure and arrangement the description of one set will suffice for an understanding of both. The band 219 is secured at one end to a rack 227 which is slidably supported on a sliding block 228 on which is also slidably supported a rack 229 to which an end of the band 220 is attached. The racks 227 and 229 are engaged by a pinion 230 on a rotatable shaft 231 and since each rack is on an opposite side of the pinion 230 and the knob 223 is mounted on the shaft 231 turning of the knob 223 will cause simultaneous movement of the bands 219 and 220 in opposite directions. A clockwise rotation of the knob 223 will bring the bands 219 and 220 toward the center of the table 175. The sliding block 228 and the racks 227 and 229 are located in a channel bar 232 the opposite side walls of which extend upward in frictional engagement with the block 228 and the racks 227 and 229. The channel bar 232 is supported on posts 233 by means of screws 234 and extends in parallel spaced relation with the side wall 215 of the frame plate 176. A cover 235 is provided for the upper and the outer side portions of the channel bar 232, the cover 235 being supported in place by the screws 234 and having an elongated aperture 236 provided therein for accommodation of the shaft 231. The base portion of the channel bar 232 as shown in Fig. 24 is cut away at 237 to accommodate a tapped lug 238 which extends downward from the sliding block 228. The lug 238 is in screw threaded engagement with a male threaded shaft 239 which is journaled in a bearing 240 supported in one end of the channel bar 232, the inner end of the shaft 239 being rotatably supported and retained against longitudinal movement in a portion of the base of the channel bar 232. When the knob 224 is turned the sliding block 228 is moved longitudinally within the channel bar 232 and this same motion is transmitted by means of the shaft 231, the pinion 230 and the racks 227 and 229 to the bands 219 and 220. It will be seen therefore that the bands 219 and 220 may be simultaneously moved toward or away from the center of the table 175 by operation of the knob 223 and that when the knob 224 is turned the bands 219 and 220 are simultaneously moved either backward or forward over the upper surface of the frame plate 176 and over the table 175. The bands 221 and 222 are provided with the same kind of operating means as the bands 219 and 220 and may be simultaneously moved toward or away from the center of the table 175 by turning the knob 225 and may be simultaneously moved, both in the same direction, over the frame plate 176 and the table 175 by turning the knob 226. The bands 219, 220, 221 and 222 may therefore be moved to cooperatively embrace as shown in Fig. 1 the crystal 172 and will hold the crystal 172 in a required position on the table 175 while an end of the wire 57 is being solder-connected to the stripe 173 on the crystal. It will be seen that the bands 221 and 222 overlap the bands 219 and 220 and that the free ends of the bands 221 and 222 are overlapped by an angle bar 241 which is secured to the rear portion of the frame plate 176 by means of the screws 242 shown in Fig. 20. The bands 219, 220, 221 and 222 are therefore prevented from jumping over the crystal. If in order to get the solder connection at some predetermined point off-center from the central portion of the stripe 173 it is found necessary to slightly rotate the crystal from the position shown in Fig. 1 this may be accomplished by loosening the screw 218 shown in Fig. 24 to release the pressure of the holding bar 211 against the table 175. The frame plate 176 may then be rotated relative to the table 175. This action will skew the crystal from the position shown in Fig. 1. The screw 218 may then be tightened to hold the frame plate 176 and the crystal 172 in the new position. The aperture 208 in the table 175 is made wide enough to permit movement of the crystal to the new position without breaking or bending a wire secured to the under surface of the crystal 172. The table 175 as shown in Fig. 20 is calibrated at 243 and a mark is provided at 244 on the frame plate 176 to indicate the extent of rotation of the frame plate 176.

Figure 2:
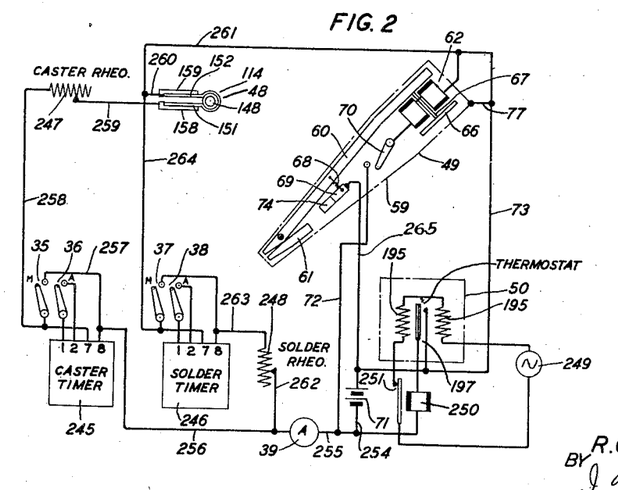
Fig. 2 is a schematic diagram of some of the apparatus involved.
Figure 3:
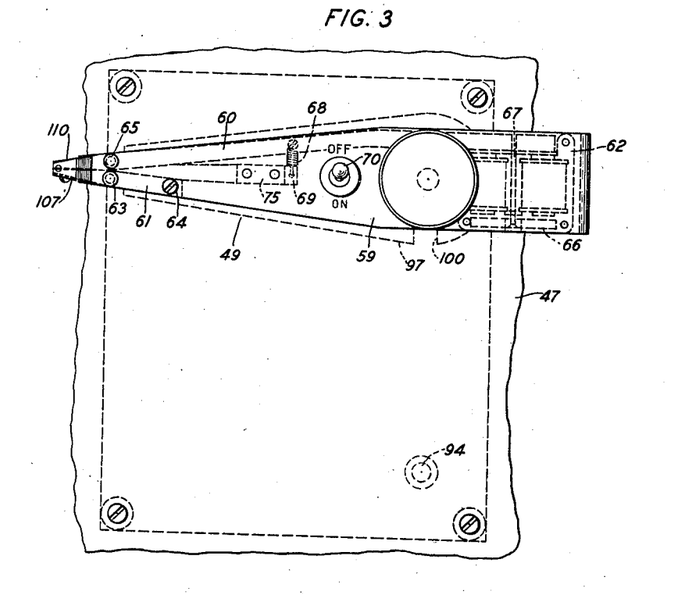
Fig. 3 is a top view of a portion of the support and a chuck for holding the wire in required positions during practice of the invention and is drawn on an enlarged scale relative to Fig. 1.
Figure 4:
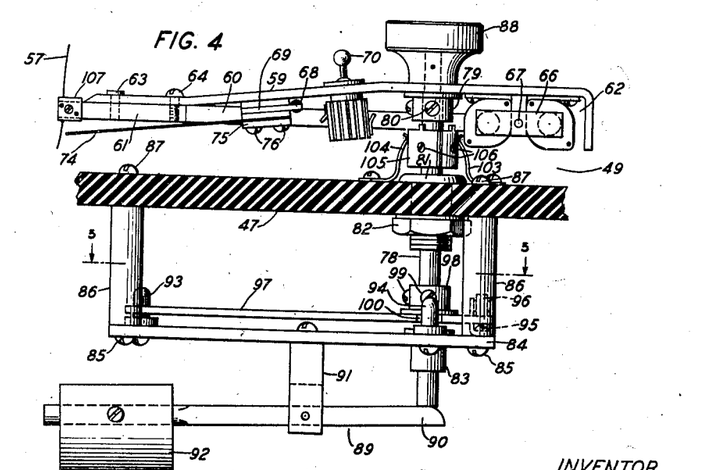
Fig. 4 is a side view, partly in section, of Fig. 3.
Figure 5:
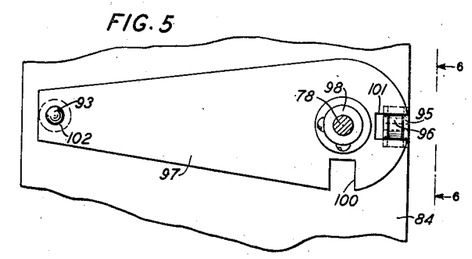
Fig. 5 is a detail part shown in Figs. 3 and 4.
Figure 6:
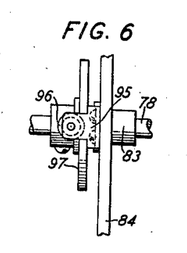
Fig. 6 is an end view of Fig. 5.
Figure 7:
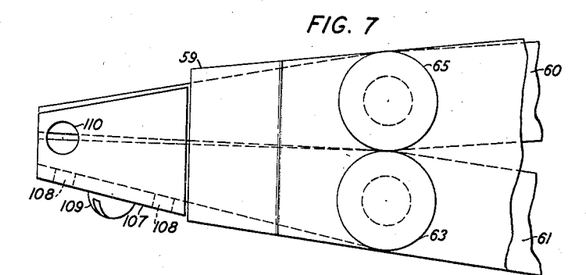
Figs. 7 and 8 are top views of jaws of the chuck, each view showing the jaws in a different position and being enlarged relative to Fig. 3.
Figure 8:
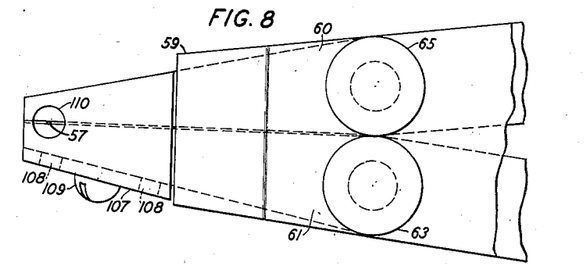
Figure 9:
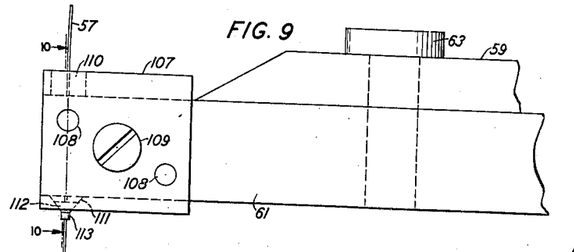
Fig. 9 is a side elevational view of Fig. 8 and having a wire supported in the jaws.
Figure 10:
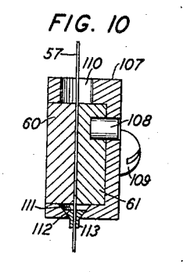
Fig. 10 is an end view, in section, of Fig. 9 taken on the line 10—10.

As shown in Fig. 2 a caster timer 245 is provided to control with time the application of heating current to the caster device 48. A solder timer 246 is provided to control with time the application of heating current to the point at which the wire is being solder-connected to the stripe 173 on the crystal 172. These timer devices may be of any conventional character and form suitable for controlling with time the application of the heating currents. The thermostat 197 controls the application of heating current to the heating elements 195 in the table 175. Suitable rheostats 247 and 248 are provided to control the strength of the currents applied to the respective caster device 48, and the point at which the solder connection is being made on the crystal, the rheostats being labeled "Caster rheo." and "Solder rheo." The switches 35 and 36 are provided for respective manual and automatic control of the duration of the current applied to the caster device. The switches 37 and 38 provide for respective manual and automatic control of the duration of the current applied to the point of solder connection on the crystal.

Method of making solder connection

The crystal 172 with the solder stripe 173 thereon is placed on the table 175 which is heated by means of the heating elements 195—195 supplied with current from a suitable source 249 over an obvious circuit. The heating current from the source 249 is automatically controlled by means of the thermostat 197 and a relay 250 which will be energized to open its contacts 251 and thus open the current supplying circuit when the contacts of the thermostat 197 close at a predetermined temperature.

The wire 57 is placed between the jaws of the chuck 49 and is extended through the aperture in the button 112. The chuck 49 is lifted and rotated to bring the projecting end of the wire 57 over the table 175. The chuck 49 is then lowered to bring the bar 97 into engagement with the pin 94 and the wheel 96 to hold the chuck in required position. The straps 219, 220, 221 and 222 are moved by operation of the knobs 223 and 225 to engage the crystal 172 and bring the desired portion of the stripe 173 directly under the end of the wire 57. A suitable flux is applied to the end of the wire 57 and the fluxed end of the wire is brought into engagement with the stripe 173 so that some of the flux on the wire will be deposited on the stripe 173.

The chuck 49 with the wire 57 therein is then lifted and rotated over the caster device 48 and is lowered to bring the bar 97 into engagement with the pin 93 and the wheel 96 to hold the chuck in required position, the end of the wire 57 being thrust into the crucible 114 until the wire 57 touches the disc 138 which at the time serves as a bottom for the crucible. A screw 252 provided with a lock nut 253 is adjustably mounted on the slab 47 as shown in Fig. 12 to limit downward movement of the arm 59 to prevent undue thrusting of the end of the wire 57 into the crucible 114. The chuck is operated to hold the wire 57 so that a predetermined length of the wire will project below the button 112, the jaws of the chuck being operated to a closed position by means of the electromagnet 62 which is energized from the source of current supply 71 when the switch 70 is closed. The chuck 49 is lifted and swung to the position shown in Fig. 1 and so that the end of the wire 59 is removed from the crucible 114.

The caster device is operated to fill the crucible 114 with solder paste in the manner above described. The chuck 49 is lifted again and swung to a position over the crucible 114 and so that the end of the wire is thrust into the crucible, the depth of thrust being limited by the screw 252 against the under surface of the arm 59. The crucible 114 is electrically heated by current supplied from the source 71. For manual control of the duration of the heating current for the caster device 48 the switch 35 is operated. This closes the following circuit, source of current supply 71, conductor 254, conductor 255, ammeter 39, conductor 256, conductor 257, contacts of switch 35, conductor 258, caster rheostat 247, conductor 259, electrode 158, leg 151, leg 152, electrode 159, conductor 260, conductor 261, conductor 73 to source of current supply 71. The crucible is heated to a sufficiently high temperature to melt the solder paste in the crucible 114. The reduced end portion 113 of the button 112 is pressed downwardly within the crucible 114 by the weight of the chuck 49 while the solder paste is being brought to a molten condition. The ring-shaped form of the crucible 114 and the pressure of the button 112 makes the solder take the form of the pellet 169 when the operating current for the caster device is shut off by opening of the switch 35. It will be seen therefore that a pellet 169 of solder of predetermined size and form is cast on the end of the wire 57. Automatic timing of the duration of the heating current may be obtained by closing the switch 36 instead of the switch 35.

The chuck 49 is lifted and rotated to bring the wire 57 with the solder pellet 169 cast thereon directly over the stripe 173 on the crystal 172 and the chuck is then lowered to bring the pellet 169 into engagement with the stripe 173. In this position the contact finger 74 touches the metal coating 174 or the stripe 173 on the crystal to close an electrosoldering circuit as follows: source of current supply 71, conductor 254, conductor 255, ammeter 39, conductor 262, solder rheostat 248, conductor 263, contacts of switch 37, conductor 264, conductor 261, conductor 77, arm 59 and jaws 60 and 61, wire 57, solder pellet 169, stripe 173, finger contact 74, conductor 265 to source of current supply 71. Since the hot plate 50 comprising the table 175 is maintained at a temperature only slightly below the melting point of the solder in the pellet 169 the current applied through the point of engagement of the solder pellet 169 and the stripe 173 is sufficient to raise the temperature at this point of contact to a melting temperature for the solder. The material in the solder pellet 169 and in the stripe 173 is therefore sufficiently heated to make the parts fuse together. The current applied may be regulated by operation of the rheostat 248. If it is desired to automatically regulate the duration of the current supplied this may be accomplished by closing the switch 38 instead of the switch 37 the solder timer 246 then functioning to control the duration of the current supply.

After the wire 57 is solder-connected to the stripe 173 on the crystal 172 the wire 57 is severed at a required point to leave a relatively small length of the wire extending from the crystal. This small length of wire may be used as a lead-in wire for the crystal and also as a supporting wire for the crystal. A similar wire may be electrosoldered to a stripe 173 on the opposite face of the crystal by the process above described. In this case the wire already soldered to the surface of the crystal extends into the aperture 208 in the table 175 while the crystal 172 is being adjusted to the required position and during the second soldering operation.

What is claimed is:

1. A wire holding chuck comprising a support, an arm pivotally mounted on said support, a pair of jaw members supported on said arm, means to operate said jaw members, an apertured button supported beneath said jaw members, supporting means for said button, a contact finger insulatingly supported on said arm and extending below said arm, and said jaws and said contact finger serving as spaced electrodes of an electrowelding system.

2. A wire holding chuck comprising a support, an arm pivotally mounted on said support, a fixed jaw member mounted on said arm, movable jaw member pivotally supported on said arm and movable relative to said fixed jaw member to hold said wire, an electromagnetic device mounted on said arm and mechanically connected to said movable jaw member for operation thereof, an apertured casing supported on said fixed jaw member and extending above and below said jaw members, an apertured button supported on said casing below said jaw members and having a reduced end portion extending below said casing, said button being adapted to permit extension therethrough of said wire, a contact finger insulatingly mounted on said arm and extending below said jaw members, said jaws and said contact finger being arranged to serve as spaced electrodes of an electrosoldering system, and means to supply current to said jaw members and said contact finger.

ROBERT G. HUMPHREY.